(12) United States Patent
Wamprecht et al.

(10) Patent No.: US 11,346,021 B2
(45) Date of Patent: May 31, 2022

(54) MELT SPUN MULTIFILAMENTS BASED ON THERMOPLASTIC POLYURETHANE, THEIR PRODUCTION AND USE

(71) Applicant: Covestro Deutschland AG, Leverkusen (DE)

(72) Inventors: Christian Wamprecht, Neuss (DE); Jochen Norwig, Leverkusen (DE); Christoph Gürtler, Cologne (DE); Pavan Manvi, Aachen (DE); Gunnar Seide, Aachen (DE); Thomas Gries, Aachen (DE)

(73) Assignee: Covestro Deutschland AG, Leverkusen (DE)

( * ) Notice: Subject to any disclaimer, the term of this patent is extended or adjusted under 35 U.S.C. 154(b) by 433 days.

(21) Appl. No.: 16/330,484

(22) PCT Filed: Sep. 8, 2017

(86) PCT No.: PCT/EP2017/072657
§ 371 (c)(1),
(2) Date: Mar. 5, 2019

(87) PCT Pub. No.: WO2018/046699
PCT Pub. Date: Mar. 15, 2018

(65) Prior Publication Data
US 2019/0226123 A1    Jul. 25, 2019

(30) Foreign Application Priority Data

Sep. 9, 2016  (EP) ..................... 16188112

(51) Int. Cl.
*D01F 6/70* (2006.01)
*C08G 18/48* (2006.01)
(Continued)

(52) U.S. Cl.
CPC .......... *D01F 6/70* (2013.01); *C08G 18/3206* (2013.01); *C08G 18/4018* (2013.01);
(Continued)

(58) Field of Classification Search
None
See application file for complete search history.

(56) References Cited

U.S. PATENT DOCUMENTS

| 4,106,313 | A  | 8/1978  | Boe             |
| 8,324,419 | B2 | 12/2012 | Mijolovic et al.|

(Continued)

FOREIGN PATENT DOCUMENTS

| CA | 2114281   | A1 | 7/1995 |
| CN | 104704017 | A  | 6/2015 |

(Continued)

OTHER PUBLICATIONS

International Search Report for PCT/EP2017/072657 dated Nov. 27, 2017.

(Continued)

*Primary Examiner* — Jeffrey D Washville
(74) *Attorney, Agent, or Firm* — Faegre Drinker Biddle & Reath LLP

(57) ABSTRACT

The invention relates to melt spun multifilaments based on thermoplastic polyurethane, their production and the use of said melt spun multifilaments to produce technical textiles and clothing such as socks, stockings, compression textiles like medical bandage, surgical hose, orthopedic elastic bandage, sport textiles, underwear etc.

2 Claims, 1 Drawing Sheet

Melt spinning machine

(51) Int. Cl.

| | | |
|---|---|---|
| *C08G 18/76* | (2006.01) | |
| *C08G 18/44* | (2006.01) | |
| *C08G 18/32* | (2006.01) | |
| *C08G 18/40* | (2006.01) | |
| *C08G 18/66* | (2006.01) | |
| *D01D 5/08* | (2006.01) | |
| *C08G 18/24* | (2006.01) | |
| *C08G 18/80* | (2006.01) | |
| *D01D 1/02* | (2006.01) | |

(52) U.S. Cl.
CPC ......... *C08G 18/44* (2013.01); *C08G 18/4825* (2013.01); *C08G 18/6607* (2013.01); *C08G 18/7664* (2013.01); *D01D 5/08* (2013.01); *C08G 18/246* (2013.01); *C08G 18/8061* (2013.01); *D01D 1/02* (2013.01); *D10B 2331/10* (2013.01); *D10B 2501/02* (2013.01); *D10B 2509/02* (2013.01)

(56) References Cited

U.S. PATENT DOCUMENTS

| | | | |
|---|---|---|---|
| 9,593,199 | B2 | 3/2017 | Wamprecht et al. |
| 9,718,917 | B2 | 8/2017 | Wamprecht et al. |
| 2015/0291724 | A1* | 10/2015 | Kusano ................ C09J 175/06 524/591 |

FOREIGN PATENT DOCUMENTS

| | | |
|---|---|---|
| CN | 104837885 A | 8/2015 |
| DE | 2264611 A1 | 5/1974 |
| DE | 2264611 C3 | 6/1978 |
| DE | 2901774 A1 | 7/1980 |
| EP | 0222453 A2 | 5/1987 |
| EP | 0592668 A1 | 4/1994 |
| EP | 0974608 B1 | 10/2002 |
| EP | 0905291 B1 | 9/2003 |
| EP | 2115032 A1 | 11/2009 |
| JP | H0848740 A | 2/1996 |
| WO | WO-2008013731 A1 | 1/2008 |
| WO | WO-2008092767 A1 | 8/2008 |
| WO | WO-2014060300 A2 | 4/2014 |
| WO | WO-2014060348 A2 | 4/2014 |

OTHER PUBLICATIONS

Written Opinion of the International Searching Authority for PCT/EP2017/072657 dated Nov. 27, 2017.

* cited by examiner

Melt spinning machine
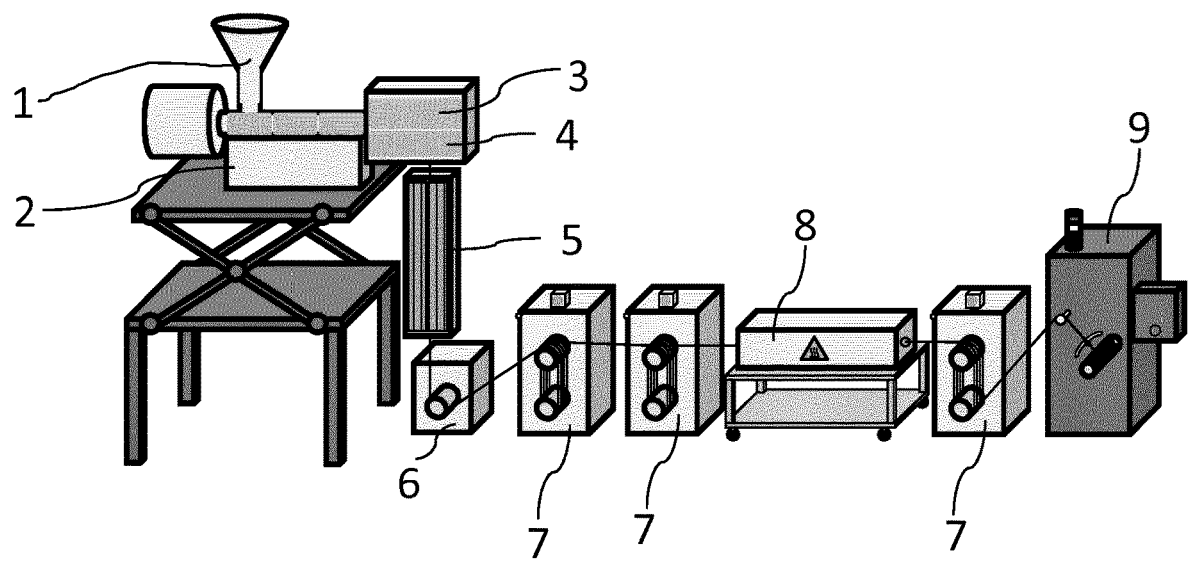

MELT SPUN MULTIFILAMENTS BASED ON THERMOPLASTIC POLYURETHANE, THEIR PRODUCTION AND USE

CROSS-REFERENCE TO RELATED APPLICATIONS

This application is a national stage application (under 35 U.S.C. § 371) of PCT/EP2017/072657, filed Sep. 8, 2017, which claims benefit of European Application No. 16188112.3, filed Sep. 9, 2016, both of which are incorporated herein by reference in their entirety.

The invention relates to melt spun multifilaments based on thermoplastic polyurethane, their production and the use of said melt spun multifilaments to produce technical textiles and clothing such as socks, stockings, compression textiles like medical bandage, surgical hose, orthopedic elastic bandage, sport textiles, underwear etc.

Melt spun monofilaments based on thermoplastic polymers as well as their production are known in the art.

EP 0974608 B1 relates to thermoplastic polyurethanes obtainable by reacting a polyol composition (A) which consists essentially of a polyester polyol (A-1) having a crystallization enthalpy of at most 70 J/g and a number average molecular weight of from 1000 to 5000, and a polyether polyol (A-2) having a number average molecular weight of from 500 to 2500, and in which the average functionality (f) of the composition (A) is between 2.006 and 2.100, and a chain extender (C), with an organic diisocyanate (B) at a ratio that satisfies the following formula:

$$1.00 \leq b/(a+c) \leq 1.10$$

wherein a indicates the number of moles of all polyols constituting the polyol composition (A), b indicates the number of moles of the organic diisocyanate (B), and c indicates the number of moles of the chain extender (C). EP 0974608 B1 also describes elastic fibres (monofilaments) based on said thermoplastic polyurethanes and a method for producing polyurethane elastic monofilaments by melt-spinning the thermoplastic polyurethane. The polyurethane elastic monofilaments have good properties of spinning stability, heat resistance, hot water resistance, elastic recovery, elongation and homogeneousness. The monofilaments are easily produced using the melt spinning process.

In EP 0592668 A1 a thermoplastic polyurethane elastomer containing a very small amount of polyurethane substrate-based small grains and having a high molecular weight and a narrow molecular weight distribution is described. Said thermoplastic polyurethane elastomer has an excellent melt-moldability so that it can be melt-spun into monofilaments while preventing filament breakage. The elastomer can be manufactured by reacting an NCO-prepolymer with a low-molecular diol in a melt polymerization process at a relatively high temperature in a short period of time.

DE 2264611 C3 describes spirally curled textile filament made of two components as well as textile products made therefrom. One of the components consists of an elastomeric polyurethane which is melt-spinnable. The polyurethane homo-filament consists of an aged polyurethane having a melting-point higher than 200° C. and below 235° C. The second filament is made of polyamide.

The polyurethane is preferably prepared from a polyester polyol, a diisocyanate and a glycol chain extender. In a preferred embodiment, the polyurethane is made by reacting a polyester polyol having a molecular weight of from 1000 to 3000, a chain extender and a polyisocyanate based on diphenyl methane diisocyanate wherein the ratio of isocyanate groups to the hydroxyl groups is from 1.0 to 1.01. The filaments are melt-spun and air-quenched in conventional manner, and a spin-finish is applied prior to wind-up.

EP 0905291 B1 describes melt-spun polyurethane elastic monofilaments having a degree of luster of 70 or less. The degree of luster is defined as (I/Io)×100, where the amount of light reflecting off the surface of the fibre is I and the amount of light reflecting off a standard white plate is Io. On the surface of the preferred polyurethane elastic filaments, ten or more mountain-like protrusions of 0.2 to 5.0 μm in height are present every 10 μm filament in the axial direction. A process for producing polyurethane elastic filaments is also described, comprising melt-spinning of butylene terephthalate-based crystalline polyester (A) and thermoplastic polyurethane (B). Before spinning, the compound (A) is melt-mixed with the thermoplastic polyurethane (B). EP 0905291 B1 also discloses fibres comprising the polyurethane elastic filament as a core.

It was an object of the present invention to provide a thermoplastic polymer which can be used in the melt spinning process in order to produce melt spun multifilaments with good properties, like e.g. tensile strength and elongation at break and which can be used in the melt spinning process without the problem that the multifilaments are ruptured during their preparation.

A further object of the invention was to provide a simple and efficient process for the production of the aforementioned multifilaments.

The invention achieves said object by providing melt spun multifilaments based on thermoplastic polyurethane using specific polyols as long chain polyol components.

A subject of the invention are melt spun multifilaments based on thermoplastic polyurethane obtained by the reaction of A) at least one organic diisocyanate
B) at least one polyol with a number-average molar mass $M_n \geq 500$ and $\leq 5000$ g/mol, and at least two isocyanate-reactive groups
C) at least one chain extender with a molar mass $\geq 60$ and $\leq 490$ g/mol, and with two isocyanate-reactive groups and
D) optionally a monofunctional chain terminator which has an isocyanate-reactive group
E) optionally catalysts
F) optionally auxiliaries and/or additives, where component B) comprises
B1) at least one polyether carbonate polyol obtainable via an addition reaction of carbon dioxide and alkylene oxides onto H-functional starter substances
B2) 0 to 70% by weight based on B) of at least one or more polyols which are different from B1)

and where the molar ratio of the isocyanate groups from A) to the entirety of the isocyanate-reactive groups in B), C) and optionally D) is $\geq 0.9:1$ and $\leq 1.2:1$.

Surprisingly, it has been found that the TPU multifilaments according to the invention have good mechanical properties. In particular they are found to have higher tensile strength and better elongation properties than corresponding TPU mono- or multifilaments based on pure C2- or C3-polyether polyols or based on polycarbonate polyols. The inventive multifilaments also retain very good elastic properties at low temperatures.

Preferred melt spun multifilaments are based on thermoplastic polyurethane which is obtained by the reaction of A) at least one organic diisocyanate selected from the group consisting of 4,4'-methylene-diphenyldiisocyanate (4,4'-MDI), 1,6-hexamethylenediisocyanate and 4,4'-diisocyanato-dicyclohexylmethane (hydrogenated 4,4'-MDI)

B) at least one polyol with a number-average molar mass $M_n \geq 1000$ and $\leq 3000$ g/mol, and with a number-average functionality of 1.9 to 2.1

C) at least one chain extender with a molar mass $\geq 60$ and $\leq 300$ g/mol, and with two isocyanate-reactive groups and D) optionally a monofunctional chain terminator which has an isocyanate-reactive group E) optionally catalysts F) optionally auxiliaries and/or additives, where component B) comprises B1) at least one polyether carbonate polyol obtainable via an addition reaction of carbon dioxide and propylene oxide or a mixture of propylene oxide with up to 30% by weight, based on the alkylene oxide mixture, of ethylene oxide onto H-functional starter substances B2) 0 to 70% by weight based on B) of at least one or more polyols which are different from B1).

and where the molar ratio of the isocyanate groups from A) to the entirety of the isocyanate-reactive groups in B), C) and optionally D) is $\geq 0.9:1$ and $\leq 1.2:1$.

Another subject of the invention is a process for the production of the inventive melt spun multifilaments comprising the following steps i) drying the above mentioned thermoplastic polyurethane until the moisture content of the thermoplastic polyurethane (TPU) is lower than 0.02% by weight, ii) feeding the dried TPU in form of granules through a hopper 1 into an extruder 2 where the TPU granules are melted, iii) feeding the melted TPU into a spinning head 4 comprising a distribution plate and a spinneret, iv) forming filaments by passing the melted TPU through the nozzles of the spinneret, v) cooling the filaments and thereby solidifying the filaments, vi) combining the filaments to a multifilament, vii) winding the multifilament onto a spool mounted in a winder 9.

The TPU-granules are dried before processing in order to obtain a moisture content of less than 0.02% by weight. The polymers are preferably dried under vacuum at elevated temperature (e.g.: 60° C. to 100° C.

The TPU-granules are fed at room temperature through a hopper 1 into an extruder 2. The extruder 2 used can be for example a single screw rotating in a heated cylinder. From the extruder 2 the melted TPU arrives in a spinning head 4 (comprising a distribution plate with several holes and spinneret having several nozzles) through a spinning pump 3. After leaving the spinning head 4 through the nozzles of the spinneret the filaments are quenched in a quenching unit 5 and are solidified by cooling, preferably air cooling and are then combined into a multifilament. The multifilament can be stretched to the required diameter by pulling it through e.g. duo rollers 7.

The temperature of the extruder 2 is preferably kept between 160° C. and 215° C. Decreasing the temperature below 160° C. causes high pressure generation and temperatures above 215° C. result in intensive bubble formation. Outside said temperature range the melt spinning process becomes instable.

The temperature in the spinning head 4 should preferably be equal or lower than the temperature in the extruder 2, preferably 0 to 20° C. lower than at the end of the extruder.

The TPU should stay in the extruder and in the spinning head not much longer than needed depending on the TPU used. A too long (depending on the TPU used) residence time results in bubble formation in the TPU melt which most likely weakens the filaments, and the filaments break.

Organic diisocyanates A) that can be used are by way of example diisocyanates described in *Justus Liebigs Annalen der Chemie*, 562, pp. 75-136.

Specific mention may be made of the following by way of example:

Aromatic diisocyanates, for example tolylene 2,4-diisocyanate, tolylene 2,4-diisocyanate/tolylene 2,6-diisocyanate mixtures, diphenylmethane 4,4'-diisocyanate, diphenylmethane 2,4'-diisocyanate, and diphenylmethane 2,2'-diisocyanate, diphenylmethane 2,4'-diisocyanate/diphenylmethane 4,4'-diisocyanate mixtures, urethane-modified liquid diphenylmethane 4,4'-diisocyanates and diphenylmethane 2,4'-diisocyanates, 4,4'-diisocyanato-1,2-diphenylethane, and naphthylene 1,5-diisocyanate. It is preferable to use, as aromatic organic diisocyanates, diphenylmethane diisocyanate isomer mixtures with >96% by weight content of diphenylmethane 4,4'-diisocyanate, and in particular diphenylmethane 4,4'-diisocyanate and naphthylene 1,5-diisocyanate. The diisocyanates mentioned can be used individually or in the form of mixtures with one another. They can also be used together with up to 15% by weight (based on the total quantity of diisocyanate) of a polyisocyanate, for example triphenylmethane 4,4',4''-triisocyanate or with polyphenyl polymethylene polyisocyanates.

Other diisocyanates A) that can be used are aliphatic and cycloaliphatic diisocyanates. Mention may be made by way of example of hexamethylene diisocyanate, isophorone diisocyanate, cyclohexane 1,4-diisocyanate, 1-methylcyclohexane 2,4-diisocyanate, and 1-methylcyclohexane 2,6-diisocyanate, and also the corresponding isomer mixtures, and dicyclohexylmethane 4,4'-, 2,4'-, and 2,2'-diisocyanate, and also the corresponding isomer mixtures. It is preferable that the aliphatic organic diisocyanate used is composed of at least 50% by weight of hexamethylene 1,6-diisocyanate, with preference 75% by weight, and particularly preferably 100% by weight.

In one preferred embodiment of the invention, the organic diisocyanate A) comprises at least one compound selected from the group of aliphatic, aromatic, cycloaliphatic diisocyanates, and particularly preferably at least one aliphatic and/or one aromatic diisocyanate, very particularly preferably at least one aromatic diisocyanate.

In the invention, component B) comprises at least one polyether carbonate polyol (B1) obtainable via an addition reaction of carbon dioxide and of alkylene oxides onto H-functional starter substances. For the purposes of the invention "H-functional" means a starter compound which has H atoms that are active in relation to alkoxylation.

The production of polyether carbonate polyols via an addition reaction of alkylene oxides and $CO_2$ onto H-functional starters is known by way of example from EP 0222453 A, WO 2008/013731 A, and EP 2115032 A and WO 2014/060300 A and WO 2014/060348 A.

It is also possible to use, as component B), mixtures of the abovementioned polyether carbonate polyols (B1) with other linear hydroxyl-terminated polyols (B2) with a number-average molar mass $M_n$ of from 500 to 5000 g/mol, preferably from 750 to 4000 g/mol, and particularly preferably from 1000 to 3000 g/mol. By virtue of the production process, these other polyols often comprise small quantities of nonlinear compounds. An expression therefore often used is "essentially linear polyols". Preferred other polyols are polyester diols, polyether diols, polycarbonate diols, and mixtures of these.

Suitable polyether diols can thus be produced by reacting one or more alkylene oxides having from 2 to 4 carbon atoms in the alkylene moiety with a starter molecule which comprises two active hydrogen atoms. Examples that may be mentioned of alkylene oxides are: ethylene oxide, 1,2-propylene oxide, epichlorohydrin, and 1,2-butylene oxide, and 2,3-butylene oxide. It is preferable to use ethylene oxide, propylene oxide, and mixtures of 1,2-propylene oxide and ethylene oxide. The alkylene oxides can be used individually, in alternating succession, or in the form of mixtures. Examples of starter molecules that can be used are: water, amino alcohols, for example N-alkyldiethanolamines, for example N-methyldiethanolamine, and diols, for example ethylene glycol, 1,3-propylene glycol, 1,4-butanediol, and 1,6-hexanediol. Mixtures of starter molecules can optionally also be used. Other suitable polyether diols are the tetrahydrofuran polymerization products containing hydroxyl groups. It is also possible to use proportions of from 0 to 30%, based on the bifunctional polyethers, of trifunctional polyethers, the quantity of these being however at most that which produces a thermoplastically processible product. The average molar masses $M_n$ of suitable polyether diols is from 500 to 6000 g/mol, preferably from 750 to 4000 g/mol, and very particularly preferably from 1000 to 3000 g/mol. They can be used either individually or else in the form of mixtures with one another.

Suitable polyester diols can by way of example be produced from dicarboxylic acids having from 2 to 12 carbon atoms, preferably having from 4 to 6 carbon atoms, and from polyhydric alcohols. Examples of dicarboxylic acids that can be used are: aliphatic dicarboxylic acids, for example succinic acid, maleic acid, glutaric acid, adipic acid, suberic acid, azelaic acid, and sebacic acid, and aromatic dicarboxylic acids, for example phthalic acid, isophthalic acid, and terephthalic acid.

The dicarboxylic acids can be used individually or in the form of mixtures, e.g. in the form of a succinic, glutaric, and adipic acid mixture. For the production of the polyester diols it can optionally be advantageous to use, instead of the dicarboxylic acids, the corresponding dicarboxylic acid derivatives, for example carboxylic diesters having from 1 to 4 carbon atoms in the alcohol moiety, carboxylic anhydrides, or acyl chlorides. Examples of polyhydric alcohols are glycols having from 2 to 10, preferably from 2 to 6, carbon atoms, for example ethylene glycol, diethylene glycol, 1,4-butanediol, 1,5-pentanediol, 1,6-hexanediol, 1,10-decanediol, 1,12-dodecanediol, 2,2-dimethyl-1,3-propanediol, 1,3-propanediol, and dipropylene glycol. The polyhydric alcohols can be used alone or optionally in a mixture with one another, as required by the desired properties. Other suitable compounds are esters of carbonic acid with the diols mentioned, in particular those having from 4 to 6 carbon atoms, for example 1,4-butanediol or 1,6-hexanediol, condensates of hydroxycarboxylic acids, for example hydroxycaproic acid, and polymerization products of lactones, for example optionally substituted caprolactones. Preferred polyester diols used are ethanediol polyadipates, 1,4-butanediolpolyadipates, ethanediol 1,4-butanediol polyadipates, 1,6-hexanediol neopentyl glycol polyadipates, 1,6-hexanediol 1,4-butanediol polyadipates, and polycaprolactones. The number-average molar mass $M_n$ of the polyester diols is from 500 to 5000 g/mol, preferably from 600 to 4000 g/mol, and particularly preferably from 800 to 3000 g/mol, and they can be used individually or in the form of mixtures with one another.

Chain extenders C) used can comprise low-molecular-weight compounds with a molar mass of ≥60 and ≤490 g/mol, preferably ≥62 and ≤400 g/mol, and particularly preferably ≥62 and ≤300 g/mol, where these have two isocyanate-reactive groups.

In one preferred embodiment of the invention, the chain extenders C) comprise, or consist of, diols, diamines, or diol/diamine mixtures, however preferably diols.

Suitable chain extenders are diols such as ethanediol, 1,3-propanediol, 1,4-butanediol, 1,5-pentanediol, 1,6-hexanediol, 1,8-octanediol, 1,10-decanediol, 1,12-dodecanediol, diethylene glycol, dipropylene glycol, neopentyl glycol, diesters of terephthalic acid with glycols having from 2 to 4 carbon atoms, for example bis(ethylene glycol) terephthalate or bis(1,4-butanediol) terephthalate, hydroxyalkylene ethers of hydroquinone, for example 1,4-di(hydroxyethyl)hydroquinone, and ethoxylated bisphenols, and also reaction products of these with ε-caprolactone.

Preferred chains extenders are aliphatic diols having from 2 to 14 carbon atoms, for example ethanediol, 1,3-propanediol, 1,4-butanediol, 1,5-pentanediol, 1,6-hexanediol, 1,8-octanediol, 1,10-decanediol, 1,12-dodecanediol, diethylene glycol, dipropylene glycol, neopentyl glycol, and 1,4-di(hydroxyethyl)hydroquinone. Particular preference is given to the use of 1,3-propanediol, 1,4-butanediol, 1,6-hexanediol, and 1,4-di(hydroxyethyl)hydroquinone as chain extender.

Other suitable chain extenders are (cyclo) aliphatic diamines, for example isophoronediamine, ethylenediamine, 1,2-propylenediamine, 1,3-propylenediamine, N-methylpropylene-1,3-diamine, N,N'-dimethylethylenediamine, and aromatic diamines, for example 2,4-tolylenediamine and 2,6-tolylenediamine, 3,5-diethyl-2,4-tolylenediamine, and 3,5-diethyl-2,6-tolylenediamine, and primary mono-, di-, tri-, or tetraalkyl-substituted 4,4'-diaminodiphenylmethanes.

Chain terminators D) that can be used are low-molecular-weight compounds having an isocyanate-reactive group, for example monoalcohols or monoamines. It is preferable to use at least one compound selected from the group of 1-octanol, stearyl alcohol, 1-butylamine, and stearylamine, and it is particularly preferable to use 1-octanol.

Suitable catalysts E) can optionally be used in the first and/or second step of the process of the invention. The conventional tertiary amines known from the prior art, e.g. triethylamine, dimethylcyclohexylamine, N-methylmorpholine, N,N'-dimethylpiperazine, 2-(dimethylaminoethoxy) ethanol, diazabicyclo[2.2.2]octane, and also organometallic compounds, for example titanium compounds, iron compounds, or tin compounds, for example tin diacetate, tin dioctanoate, tin dilaurate, or the dialkyltin salts of aliphatic carboxylic acids, for example dibutyltin diacetate or dibutyltin dilaurate, are suitable catalysts for the production of TPUs. Preferred catalysts are organometallic compounds, in particular titanium compounds or iron compounds or tin compounds.

The total quantity of catalysts in the TPUs is generally about 0 to 5% by weight, preferably from 0.0001 to 1% by weight, and particularly preferably from 0.0002 to 0.5% by weight.

It is moreover also possible to add auxiliaries and/or additional substances F). Mention may be made by way of example of lubricants, for example fatty acid esters, metal soaps of these, fatty acid amides, fatty acid ester amides, and silicone compounds, antiblocking agents, inhibitors, stabilizers with respect to hydrolysis, UV or other light, heat, and discoloration, flame retardants, dyes, pigments, inorganic and/or organic fillers. Information in greater detail concerning the auxiliaries and additional substances mentioned can be found in the technical literature, for example in the monograph by J. H. Saunders and K. C. Frisch "*High Polymers*", *volume XVI, Polyurethane, Parts* 1 and 2, Verlag Interscience Publishers 1962 and 1964, and *Taschenbuch für Kunststoff-Additive* [*Plastics additives handbook*] by R. Gächter and H Müller (Hanser Verlag Munich 1990), or DE 29 01 774 A.

The inventive melt spun multifilaments are used to produce technical textiles and clothing such as socks, stockings, compression textiles like medical bandage, surgical hose, orthopedic elastic bandage, sport textiles, underwear etc.

The following examples will provide further explanation of the invention.

EXAMPLES

Production of the TPU Granules

The TPUs were continuously produced as follows:

The mixture comprising the polyol/polyol mixture (B), Tyzor AA105 (E) and additives (F), which had been heated to about 200° C., was intensively mixed together with the isocyanate (A), which had been heated to about 170° C. by means of a heat exchanger, in a pipe with 4 static mixers manufactured by Sulzer (Type DN6 with 10 mixer elements and a shearing rate of 500 sec$^{-1}$). The mixture was then fed into the inlet of a screw device (ZSK 53 manufactured by Werner & Pfleiderer) and was then fed through the extruder with a number of revolutions of 280 r.p.m. at 200° C. At the end of the extruder the TPU strands were cooled by water, cut into granules and then dried.

Table 1 describes the components used and the proportions thereof, for the production of the TPUs.

Polyol 3: Desmophen® C2201: Polycarbonate diol with OH number of 56.2 mg KOH/g (Mn=1996 g/mol) from Covestro AG Polyol 4: Polybutylene adipate with OH number of 50.1 mg KOH/g (Mn=2240 g/mol)

Polyol 5: Polybutylen/ethylene adipate with OH number of 55.1 mg KOH/g (Mn=2036 g/mol Polyol 6: TERATHANE® PTMEG 2000: Polytetramethylene glycol with OH number of 55.8 mg/KOH/g (Mn=2011 g/mol) from INVISTA MDI: Desmodur® 44M with NCO content of 33.6% from Covestro AG Catalyst 1: Tyzor® AA105: Titanium catalyst from Dorf Ketal Catalyst 2: Tin dioctoate Additive 1: Irganox® 1010: Antioxidant from BASF SE Additive 2: Stabaxol® I: hydrolytic stabilizer from Rhein Chemie GmbH Additive 3: Oil M350: Silicon oil from Momentive Additive 4: Tinuvin® PUR 866: Light stabilizer from BASF SE Additive 5: Tinuvin® 234: Light stabilizer from BASF SE Additive 6: Tinuvin® 622: Light stabilizer from BASF SE Additive 7: Irgafos® 126: Antioxidant from BASF SE Additive 8: Irgafos® P-EPQ: Antioxidant from BASF SE Additive 9: Loxiol® 3324: N,N'-ethylene-bis-stearamide from Emery Oleochemicals Additive 10: Licowax® E: Ester of montanic acids with multifunctional alcohols from Clariant

DESCRIPTION OF THE MELT SPINNING MACHINE AND ITS PREPARATION

Before melt spinning, it should be ensured that the TPU does not contain more than 0.02% by weight of moisture. In order to achieve this low water content, the TPU granules

TABLE 1

Molar proportions of the starting components for the synthesis of the TPUs

| Example | Polyol no. | Polyol [mol] | 4,4'-MDI [mol] | 1,4-Butanediol/ 1,6-Hexanediol [mol] | Catalyst [ppm] | Additives [% by weight] |
|---|---|---|---|---|---|---|
| 1 | 1 and 2 | 0.5 and 0.5 | 4.01 | 2.76 and 0.25 | C1: 34.5 | A1: 0.06 A9: 0.90 |
| 2 | 1 and 2 | 0.5 and 0.5 | 4.54 | 3.46 and 0.0 | C1: 15 | A1: 0.10 A3: 0.30 A4: 0.35 A7: 0.12 A9: 0.50 |
| 3* | 1 | 1 | 3.18 | 1.98 and 0.20 | C1: 30 | A1: 0.33 A3: 0.91 A8: 0.11 A9: 0.59 |
| 4* | 6 | 1 | 2.27 | 1.27 | C2: 250 | A1: 0.24 A5: 0.50 A6: 0.30 A10: 0.59 |
| 5* | 3 and 4 and 5 | 0.5 and 0.17 and 0.33 | 4.49 | 3.49 | C1: 8 | A1: 0.10 A2: 0.30 A9: 0.27 |

*comparative example

Polyol 1: Acclaim® 2200N: Polypropylene oxide glycol with OH number 56.1 mg KOH/g ($M_n$=2000 g/mol) from Covestro AG.

Polyol 2: Polyether carbonate diol based on propylene oxide and $CO_2$ with OH number 54.3 mg KOH/g ($M_n$=2066 g/mol) and with 18.7% by weight incorporated $CO_2$ content.

were dried overnight under vacuum at 80° C. in an oven. The dried TPU granules were collected in aluminum bags and sealed with a hot press to protect the dried granules from atmospheric moisture.

The melt spinning machine used consists of the following parts: a hopper 1, an extruder 2, a spinning pump 3, a spinning head 4, a filament quenching unit 5, a take-up roller 6, duo rollers 7, optionally a relaxation unit 8 and a winder 9 [see FIG. 1]. The melt spinning machine was prepared before the melt spinning experiment as follows: The extruder 2, spinning pump 3 and spinning head 4 were heated.

Then the dried polymer was filled into the hopper 1 under a constant flow of nitrogen to avoid the intake of moisture. The pressure at the extruder head was set to 35 bar. Then the extruder 2 and spinning pump 3 were started. To achieve a constant throughput, the rotations per minute (RPM) of the spinning was constant and the RPM of the extruder 2 varied to keep the extruder head pressure at 35 bar. The purging was carried out for 1 hour to ensure that no traces of previous polymer were remaining in the machine.

After purging and after a stable extrusion process was achieved, the filaments were produced and were cooled below the spinning head 4 (comprising a distribution plate and a spinneret) in the quenching unit 5 with air and collected in form of a bundle of filaments (multifilament), passed over the take-up roller 6, three duo rollers 7 and collected on a winder 9.

Production of the TPU-Multifilaments

The TPU-granules were dried before processing in order to obtain a moisture content of less than 0.02% by weight. The polymers were dried in a vacuum oven at 80° C. and 10 mbar for about 12 hours.

The dried TPU-granules were fed at room temperature through the hopper 1 under a constant flow of nitrogen into the extruder 2. The extruder used in the experiments had a single screw rotating in a heated cylinder. From the extruder 2 the melted TPU arrived in a spinning head 4 through a spinning pump 3. After leaving the spinning head the filaments were quenched in a quenching unit 5 and solidified by air cooling. The filaments were combined to a bundle (multifilament). The multifilament was stretched by pulling it through the duo rollers 7 and collecting it on the winder 9. The process parameters are described in the tables.

TABLE 2

Process parameters for the production of non-inventive TPU multifilaments

| | TPU used | | | | | | | |
|---|---|---|---|---|---|---|---|---|
| | 3* | 3* | 4* | 4* | 4* | 5* | 5* | 5* |
| | | | | Experiment | | | | |
| | 1 | 2 | 3 | 4 | 5 | 6 | 7 | 8 |
| Extruder temperature [° C.] | | | | | | | | |
| Zone 1 | 170 | 170 | 170 | 170 | 170 | 185 | 185 | 185 |
| Zone 2 | 190 | 190 | 180 | 180 | 180 | 205 | 205 | 205 |
| Zone 3 | 200 | 200 | 190 | 190 | 190 | 215 | 215 | 215 |
| Spinning pump temperature [° C.] | 195 | 195 | 190 | 190 | 190 | 205 | 205 | 205 |
| Spinning head temperature [° C.] | 195 | 195 | 190 | 190 | 190 | 205 | 205 | 205 |
| Spinning pump speed; rotations per minute [RPM] | 5 | 5 | 5 | 5 | 5 | 15 | 15 | 15 |
| Residence time of the TPU in extruder and spinning head [min.] | 12.2 | 12.2 | 12.2 | 12.2 | 12.2 | 3.4 | 3.4 | 3.4 |

TABLE 2-continued

Process parameters for the production of non-inventive TPU multifilaments

| | TPU used | | | | | | | |
|---|---|---|---|---|---|---|---|---|
| | 3* | 3* | 4* | 4* | 4* | 5* | 5* | 5* |
| | | | | Experiment | | | | |
| | 1 | 2 | 3 | 4 | 5 | 6 | 7 | 8 |
| Roller speeds [m/min]: | | | | | | | | |
| Take-up roller 6 | 24 | 59 | 35 | 35 | 46 | 45 | 50 | 51 |
| First duo roller | 19 | 56 | 36 | 36 | 59 | 47 | 53 | 54 |
| Second duo roller | 36 | 79 | 46 | 57 | 80 | 57 | 65 | 65 |
| Drawing temperature [° C.] in the relaxation unit 8 | 80 | 80 | 100 | 100 | 100 | 80 | 80 | 80 |
| Winding speed in the winder 9 [m/min] | 34 | 71 | 46 | 55 | 76 | 61 | 68 | 68 |

TABLE 3

Process parameters for the production of inventive TPU multifilaments

| | thermoplastic poly-urethane used | | | | | |
|---|---|---|---|---|---|---|
| | | 2 | | | | 1 |
| | | | Experiment | | | |
| | 1 | 2 | 3 | 4 | 5 | 6 |
| Extruder temperature [° C.] | | | | | | |
| Zone 1 | 195 | 195 | 195 | 195 | 195 | 200 |
| Zone 2 | 200 | 200 | 200 | 200 | 200 | 200 |
| Zone 3 | 215 | 215 | 215 | 215 | 215 | 200 |
| Spinning pump temperature [° C.] | 210 | 210 | 210 | 210 | 210 | 212 |
| Spinning head temperature [° C.] | 210 | 210 | 210 | 210 | 210 | 215 |
| Spinning pump speed in rotations per minute [RPM] | 15 | 15 | 15 | 15 | 15 | 10 |
| Residence time of the TPU in extruder and spinning head [min.] | 3.4 | 3.4 | 3.4 | 3.4 | 3.4 | 6.1 |
| Roller speeds [m/min]: | | | | | | |
| Take-up roller 6 | 110 | 90 | 80 | 80 | 80 | 73 |
| First duo roller | 110 | 92 | 85 | 85 | 85 | 73 |
| Second duo roller | 110 | 95 | 95 | 95 | 95 | 73 |
| Drawing temperature [° C.] in the relaxation unit 8 | Room temperature (RT) | RT | 60 | 70 | 80 | RT |
| Winding speed [m/min] | 110 | 97 | 97 | 97 | 97 | 73 |

The following test methods were used:

The fineness of the multifilaments was determined according to the DIN EN ISO 2060.

The tensile strength and the elongation of the multifilaments was measured in accordance to the DIN EN ISO 2062.

Table 4 describes the properties determined for the comparative TPU-multifilaments from Table 2.

TABLE 4

Multifilament properties

| | Example | | | | | | | |
|---|---|---|---|---|---|---|---|---|
| | 1 | 2 | 3 | 4 | 5 | 6 | 7 | 8 |
| Fineness [dtex] | 510.48 | 226.24 | 397.73 | 371.15 | 269.98 | 783.88 | 671.55 | 687.87 |
| Tensile strength [cN/tex] | 2.82 | 5.18 | 3.39 | 3.33 | 4.16 | 4.88 | 5.06 | 4.69 |
| Elongation [%] | 206.2 | 197.9 | 279.17 | 263.21 | 193.84 | 329.51 | 307.64 | 298.52 |

Table 5 describes the properties determined for the inventive TPU-multifilaments from Table 3.

TABLE 5

Multifilament properties

| | Example | | | | | |
|---|---|---|---|---|---|---|
| | 1 | 2 | 3 | 4 | 5 | 6 |
| Fineness [dtex] | 395.47 | 441.97 | 385.43 | 426.33 | 374.4 | 277.23 |
| Tensile strength [cN/tex] | 7.4 | 6.14 | 7.01 | 7.2 | 7.35 | 5.41 |
| Elongation [%] | 401.4 | 330.4 | 401.7 | 405.6 | 413 | 460.9 |

The TPU-multifilaments of the invention have a markedly better level of mechanical properties than the respective comparative multifilaments, this being particularly apparent from the tensile strength as well as the elongation at break.

What is claimed is:

1. Melt spun multifilaments based on thermoplastic polyurethane obtained by the reaction of
   A) at least one organic diisocyanate
   B) at least one polyol with a number-average molar mass $M_n \geq 500$ and $\leq 5000$ g/mol, and at least two isocyanate-reactive groups
   C) at least one chain extender with a molar mass $\geq 60$ and $\leq 490$ g/mol, and with two isocyanate-reactive groups and
   D) optionally a monofunctional chain terminator which has an isocyanate-reactive group
   E) optionally catalysts
   F) optionally auxiliaries and/or additives,
   where component B) comprises
      B1) at least one polyether carbonate polyol obtainable via an addition reaction of carbon dioxide and alkylene oxides onto H-functional starter substances
      B2) 0 to 70% by weight based on B) of at least one or more polyols which are different from B1)
   and where the molar ratio of the isocyanate groups from A) to the entirety of the isocyanate-reactive groups in B), C) and optionally D) is $\geq 0.9:1$ and $\leq 1.2:1$.

2. The melt spun multifilaments according to claim 1 based on thermoplastic polyurethane which is obtained by the reaction of
   A) at least one organic diisocyanate selected from the group consisting of 4,4'-methylene-diphenyldiisocyanate (4,4'-MDI), 1,6-hexamethylenediisocyanate and 4,4'-diisocyanato-dicyclohexylmethane (hydrogenated 4,4'-MDI)
   B) at least one polyol with a number-average molar mass $M_n \geq 1000$ and $\leq 3000$ g/mol, and with a number-average functionality of 1.9 to 2.1
   C) at least one chain extender with a molar mass $\geq 60$ and $\leq 300$ g/mol, and with two isocyanate-reactive groups and
   D) optionally a monofunctional chain terminator which has an isocyanate-reactive group
   E) optionally catalysts
   F) optionally auxiliaries and/or additives,
   where component B) comprises
      B1) at least one polyether carbonate polyol obtainable via an addition reaction of carbon dioxide and propylene oxide or a mixture of propylene oxide with up to 30% by weight, based on the alkylene oxide mixture, of ethylene oxide onto H-functional starter substances
      B2) 0 to 70% by weight based on B) of at least one or more polyols which are different from B1)
   and where the molar ratio of the isocyanate groups from A) to the entirety of the isocyanate-reactive groups in B), C) and optionally D) is $\geq 0.9:1$ and $\leq 1.2:1$.

* * * * *